Nov. 2, 1943.   W. C. BARNES ET AL   2,333,086
FLAW DETECTING APPARATUS
Filed June 10, 1936
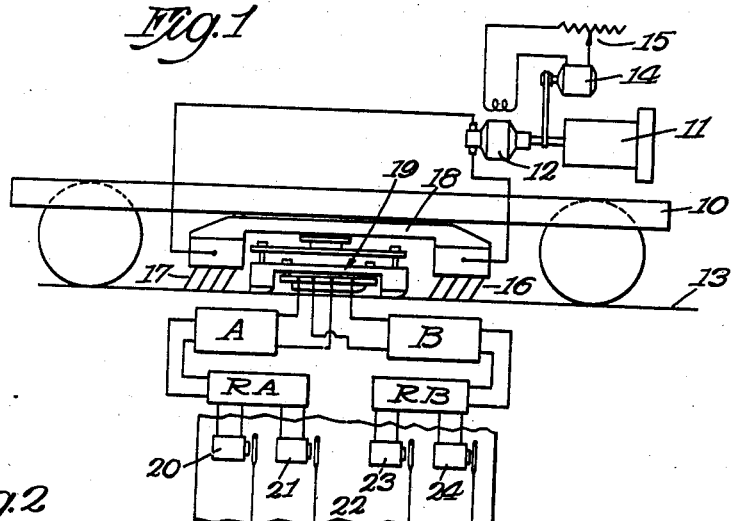
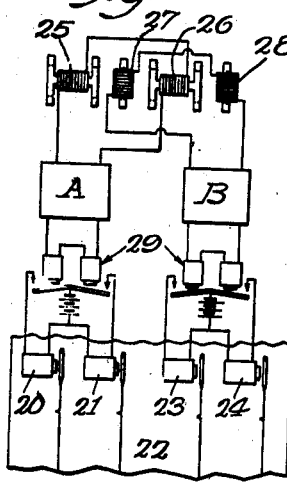
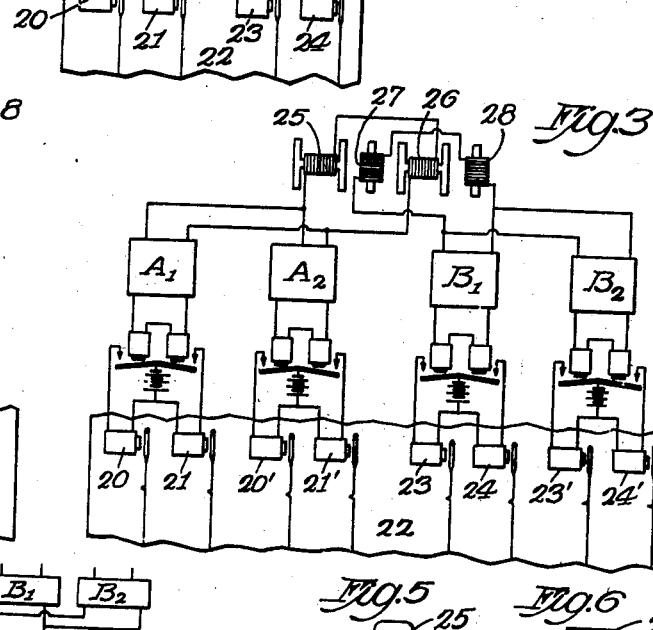
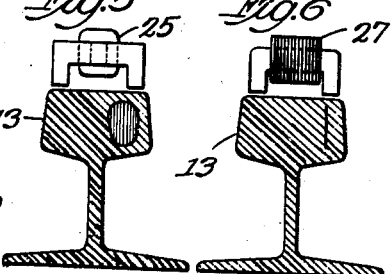
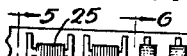
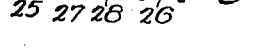
Inventors:
Walter C. Barnes
Henry W. Keevil
By Gibson, Mann
Attys.

Patented Nov. 2, 1943

2,333,086

UNITED STATES PATENT OFFICE

2,333,086

FLAW DETECTING APPARATUS

Walter C. Barnes, Lake Bluff, and Henry W. Keevil, Highland Park, Ill.

Application June 10, 1936, Serial No. 84,428

4 Claims. (Cl. 175—183)

When rails are being tested by means of induction coils which are positioned so as to be responsive to magnetic flux set up in the vicinity of the rail, it has been found that longitudinal induction coils, i. e. coils placed with their axes longitudinally of the rail, are more responsive to certain types of flaws than transverse coils, i. e. coils placed with their axes transversely of the rail, and conversely, transverse coils are more responsive to other types of flaws than longitudinal coils. For this reason, it is desirable to use both types of coils conjointly, and experienced detector car operators can tell from the type of indication that comes through on the recording apparatus (but only when the apparatus is connected up in accordance with the disclosure of this invention), the probable type of fissure that causes the indication on the recording apparatus. It is also possible by this invention for an experienced car operator to disregard certain indications that come through on the recording apparatus because he knows through experience that when one type of coil produces an indication on a particular kind of rail, and the other coil does not, it is some surface irregularity that is causing the indication to come through and not a flaw. By differentiating between indications produced by the two types of coils, the car operator is able to cover more mileage per day and more accurately determine the condition of the rail, and it is the attainment of this advantage which constitutes the principal object of the invention.

There are, of course, further and other objects and advantages as will appear from the specific disclosure which follows, in which Fig. 1 is a diagrammatic view showing a detector car which utilizes the invention;

Fig. 2 is a view showing in some detail the electrical connections between the induction coils and the recording apparatus;

Fig. 3 shows a modification of the arrangement shown in Fig. 2;

Fig. 4 shows a modification of the arrangement shown in Fig. 3;

Fig. 5 and Fig. 6 are transerse, sectional views taken on the lines 5—5 and 6—6, respectively of Fig. 8, and illustrating the probable reason for the ability of the two types of coils to differentiate between transverse fissures and longitudinal split heads;

Figs. 7–11, inclusive, are semi-diagrammatic views showing other possible arrangements of the sets of detector coils.

While this invention will be described with particular reference to that method of testing which makes use of a magnetic field set up by passing direct current through the rail, it will be understood that the invention is equally applicable to other methods of testing where the magnetic flux is produced in other ways.

Referring now to Fig. 1, the reference character 10 designates a car upon which a gasoline engine 11, or other prime mover is mounted. The engine drives a direct current generator 12 capable of delivering several thousand amperes of current to the rail 13 under test. An exciter 14 is driven from the engine shaft, and it controls through a rheostat 15 the field of the generator 12. The two poles of the generator 12 are connected to brushes 16 and 17 which are adapted to make contact with the rail 13, the brushes being supported by a carriage 18 beneath which is mounted a detector unit, generally designated 19.

The detector unit comprises a plurality of detector coils, the precise arrangement of which will be described later, but there are at least two induction coils within the unit 19, one coil being connected through an amplifier A to a recorder RA which operates pen units 20 and 21 adapted to make a permanent record on a moving chart 22, and the other coil is connected to an amplifier B which in turn is connected to a recorder RB operating pen units 23 and 24 which also make a permanent record on the sheet 22. Details of the amplifiers and the recording apparatus are unimportant here because their use in the field of flaw detection is well known to the art.

When the flux surrounding the rail is set up by the electrical method shown in Fig. 1, two sets of induction coils are included within the detector unit 19, one set comprising coils 25 and 26 which are positioned so that they are particularly responsive to longitudinal components of flux and the other set comprising coils 27 and 28 positioned so that they are particularly responsive to transverse components of flux. For convenience, the coils 25 and 26 will be referred to as longitudinal coils, and the coils 27 and 28 will be referred to as transverse coils.

In order to balance out possible variations in the current that is being passed through the rail, the coils constituting each set are connected in opposition in a maner that is well known to the art, and the output of the longitudinal coils is connected to the amplifier A, and the output from the transverse coils is connected to the amplifier B.

With certain types of pen units, it is possible to operate them directly from the amplifiers without additional electromotive force. But in the pen units shown in the drawing, the amplifiers operate relays, generally designated 29 which momentarily close local circuits associated with the pen units 20, 21, 23 and 24.

Two pen units are preferably associated with each amplifier so as to differentiate between small and large indications passing through the amplifier. This practice is well known in the art.

Obviously the record lines produced by the pen units 20 and 21 are subject only to the action of the longitudinal coils 25 and 26, and likewise, the record lines produced by the pen units 23 and 24 are subject only to the action of the transverse coils 27 and 28. The car operator is, therefore, able to immediately interpret the indications that come through on the chart and differentiate at least to some extent between transverse fissures, longitudinal split heads and other type of flaws, and false indications.

For reasons that are fully explained in our co-pending application, Ser. No. 722,356, now U. S. Patent No. 2,109,455 issued March 1, 1938, it is sometimes desirable to employ two amplifiers with the longitudinal coil or coils (a corresponding advantage is gained by employing two amplifiers with the transverse coil or coils), the connections between any one coil and the amplifiers associated with it being reversed so that both positive and negative parts of the electrical impulse set up within the coil when a flaw is passed over by the coil are separately amplified and recorded. Thus amplifiers A1 and A2 (identical in all respects) may be associated with the longitudinal coils 25 and 26 (which are connected in opposition) as shown in Fig. 3, in such a way that the positive portion of the electrical impulse set up by the coils 25 and 26 will be amplified by one amplifier, for example A1, and the negative portion will be amplified by the other amplifier A2, and pen units 20, 21, 20' and 21' will separately record the outputs from the two amplifiers.

Similarly, amplifiers B1 and B2 are connected oppositely to the transverse coils 27 and 28 (which are connected in opposition to each other) and positive and negative impulses produced by the transverse coils are separately indicated by the pen units 23, 24, 23' and 24'.

In some cases, eight record lines (as shown in Fig. 3) may be considered confusing, and if so, the outputs of the amplifiers A1 and A2 may be combined, as shown in Fig. 4 to operate only two pen units 20 and 21, and the outputs of the amplifiers B1 and B2 may likewise be combined to operate only two pen units 23 and 24, as also shown in Fig. 4.

It will be observed that the principal advantages of double amplification are retained even though the outputs of the two amplifiers are combined, for both positive and negative components of the induced wave are amplified and recorded.

There are various arrangements of coils which may be used, and it will be understood that the invention is not limited to any particular arrangement nor is it necessary in all instances that each set of coils, that is longitudinal and transverse coils, consist of two coils connected in opposition. Other examples of possible arrangements for two two-coil sets are shown in Figs. 7-11 inclusive.

Under ordinary circumstances, the two longitudinal coils are connected in opposition and the two transverse coils likewise connected.

By referring to Figs. 5 and 6 it will be seen why a transverse fissure for example, when it faces have been polarized, is more certain of being detected by a longitudinal coil, and why a vertical split head, when similarly polarized is best detected by a transverse coil.

What we claim is:

1. In apparatus for detecting flaws in metallic bodies through which a magnetic flux has been established, and a detector unit adapted to be passed over the body to indicate flaws therein, said unit comprising a pair of induction coils, one of which is substantially transverse to the body and the other substantially longitudinal thereof, and a pair of amplifiers associated with each of said two coils, the connection between any one coil and an amplifier associated with said coil being reversed with respect to the connection between said one coil and the other amplifier associated with said one coil.

2. In apparatus for detecting flaws in metallic bodies through which a magnetic flux has been established, and a detector unit adapted to be passed over the body to indicate flaws therein, said unit comprising a pair of induction coils, one of which is substantially transverse to the body and the other substantially longitudinal thereof, and a pair of amplifiers associated with each of said two coils, the connection between any one coil and an amplifier associated with said coil being reversed with respect to the connection between said one coil and the other amplifier associated with said one coil, and means for separately recording the indications passing through the amplifiers.

3. In apparatus for detecting flaws in metallic bodies through which a magnetic flux has been established, and a detector unit adapted to be passed over the body to indicate flaws therein, said unit comprising a pair of induction coils, one of which is substantially transverse to the body and the other substantially longitudinal thereof, and a pair of amplifiers associated with each of said two coils, the connection between any one coil and an amplifier associated with said coil being reversed with respect to the connection between said one coil and the other amplifier associated with said one coil, and separate recording apparatus for each two amplifiers associated with any one coil.

4. In apparatus for detecting flaws in metallic bodies through which a magnetic flux has been established, and a detector unit adapted to be passed over the body to indicate flaws therein, said unit comprising a pair of induction coils, one of which is substantially transverse to the body and the other substantially longitudinal thereof, and a pair of amplifiers associated with each of said two coils, the connection between any one coil and an amplifier associated with said coil being reversed with respect to the connection between said one coil and the other amplifier associated with said one coil, and separate recording apparatus for each two amplifiers associated with any one coil, said recording apparatus including a pen responsive to both of said amplifiers.

WALTER C. BARNES.
HENRY W. KEEVIL.